E. L. CROSWHITE.
WIRE REEL.
APPLICATION FILED DEC. 27, 1920.

1,399,934.

Patented Dec. 13, 1921.
2 SHEETS—SHEET 1.

Witness:
R. E. Hamilton

Inventor:
Estel L. Croswhite
By Warren W. House
His Attorney.

E. L. CROSWHITE.
WIRE REEL.
APPLICATION FILED DEC. 27, 1920.

1,399,934.

Patented Dec. 13, 1921.
2 SHEETS—SHEET 2.

Witness:
R. C. Hamilton

Inventor,
Estel L. Croswhite.
By Warren D. House,
His Attorney.

UNITED STATES PATENT OFFICE.

ESTEL L. CROSWHITE, OF KANSAS CITY, MISSOURI.

WIRE-REEL.

1,399,934.  Specification of Letters Patent.  Patented Dec. 13, 1921.

Application filed December 27, 1920. Serial No. 433,106.

*To all whom it may concern:*

Be it known that I, ESTEL L. CROSWHITE, a citizen of the United States, residing at Kansas City, in the county of Jackson and State of Missouri, have invented a certain new and useful Improvement in Wire-Reels, of which the following is a specification.

My invention relates to improvements in wire reels.

The object of my invention is to provide a novel reel adapted to be attached to and revolved with a vehicle wheel and arranged to be adjusted so as to support bundles of coiled wire having different diameters and arranged for the automatic winding of the wire thereon, or for the automatic unwinding of the wire.

A further object of my invention is to provide a wire reel which is simple, cheap to make, durable and not liable to get out of order, which is efficient in operation, and which can be readily mounted on a vehicle wheel or a vehicle body.

The novel features of my invention are fully described and claimed.

In the accompanying drawings, which illustrate the preferred embodiment of my invention, Figure 1 is a side elevation of my improved wire reel shown mounted on the vehicle wheel, a portion of the body of the vehicle being shown.

Similar reference characters designate similar parts in the different views.

1 and 2 designate respectively a wagon box and rear wheel.

3 designates a ring, preferably, a right angle in cross section arranged to encircle the hub 4 of the wheel 2.

Figure 1:
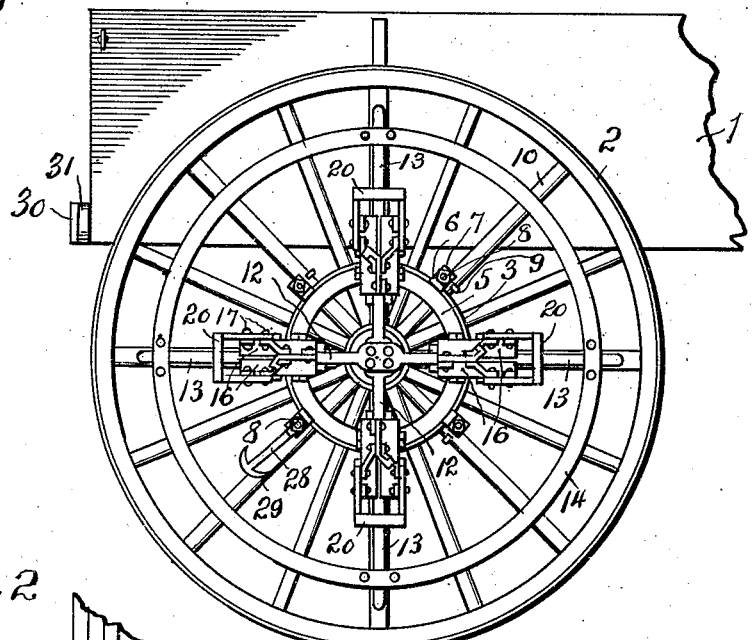

Rotatably mounted in the ring 3 is a rotary member 5, which is held in position by means of plates 6, Fig. 1, which are clamped to peripheral lugs 7 on the ring 3 by means of bolts 8, which at their inner end are provided respectively with hooks 9 adapted to respectively embrace the spokes 10 of the wheel 2.

The member 5 has outwardly extending arms 11. I provide two crossed bars 12, which are, preferably, rigidly and centrally attached to each other and which are respectively provided with two radial diametrically opposite U-shaped portions 13, the inner arms of which are respectively rigidly secured to the arms 11.

A bracing ring 14 is rigidly attached to the outer arms of the U-shaped portions 13 by U-bolts 15.

I provide wire bundle supporting means comprising, preferably, the following described parts:

Upon each U-shaped portion 13 is a pair of clamping plates 16 disposed respectively at opposite sides of and clamped to the adjacent portion 13 by means of two bolts 17 having nuts 18 and which extend between the arms of the adjacent U-shaped portion 13. Preferably, each plate 16 is provided with two grooves 19 in which are respectively fitted the arms of the adjacent U-shaped portion 13. This construction prevents the plate 16 from turning, while permitting of the radial adjustment of the plate 16 on the bars 12. This adjustment may be obtained after having loosened the nuts 18. The inner surfaces of the grooves 19 may be milled or roughened to fit against correspondingly roughened portions of the rods 12.

20 designates a plurality of U-shaped coil holding members, each of which has its arms pivoted by transverse bolts 21 to the two clamping plates 16 of an adjacent pair. The members 20 are arranged to be swung on the bolts 21 to and from a wire holding position, as shown in Figs. 1 and 2.

Figure 2:
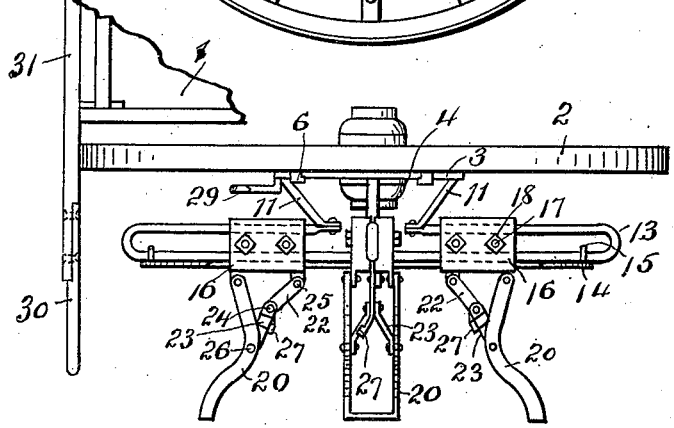
Fig. 2 is a top view of what is shown in Fig. 1.
Figure 4:
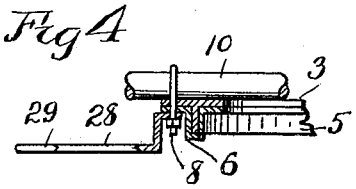
Fig. 4 is an enlarged sectional view of the pivoted hook and parts connected therewith.
Figure 5:
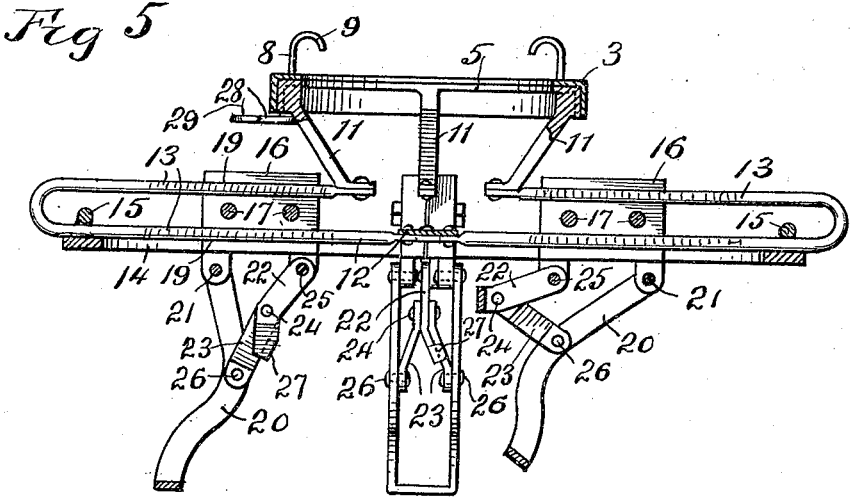
Fig. 5 is a horizontal section of the wire reel.
Figure 6:
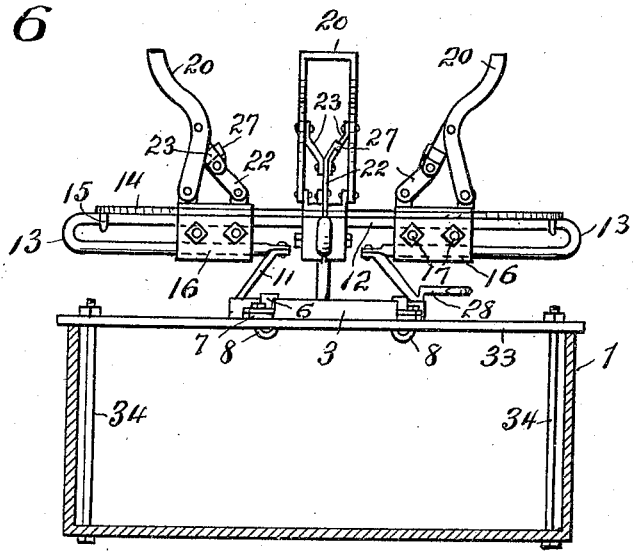
Fig. 6 is a rear elevation of the reel shown mounted on a wagon bed, which is shown in vertical section.

For releasably locking the members 20 in the coil holding position, shown in Figs. 1, 2 and 6, and at the left in Fig. 5, I provide a link 22, which is pivoted between two links 23 by a transverse pin 24. The link 22 is pivoted to one of the adjacent plates 16 by a transverse pin 25. The links 23 are respectively pivoted to the arms of the adjacent member 20 by two pins 26.

When an arm 20 is moved from the bundle release position shown at the right in Fig. 5, to the bundle holding position shown at the left in Fig. 5, the pin 24 crosses a plane which extends through the pins 25 and 26. On the link 22 is provided a lip 27, which strikes one of the links 23 so as to limit the movement of the links 23 in passing to the holding position.

By means of this construction, the pressure of the wire carried on the outer edges of the members 20 will not tend to force said members from the holding position, but on the contrary such pressure will tend to hold the members 20 in the coil holding position. The members 20 may be swung to the release position shown at the right in Fig. 5, swinging the links 22 and 23 to the position shown at the right in Fig. 5.

In order that the rotary member 5 may be locked, when desired, against rotation on the base member 3, there is pivoted to one of the bolts 8, a locking member 28 having two oppositely facing hooks 29, either of which is adapted to releasably engage any of the arms 11 of the rotary member 5.

Figure 3:
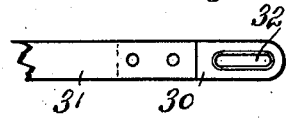
Fig. 3 is a rear elevation of a portion of the wire guide.

For guiding the wire on to the members 20, when the latter are in the holding position, I provide a horizontal plate 30 which is attached to a horizontal transverse bar 31, which is rigidly attached to the rear end of the bed 1. The plate 30 is provided with a longitudinal slot 32, Fig. 3, through which the wire passes.

When it is desired to wind wire which is strung along the ground, the wire is extended through the slot 32 and is attached to one of the members 20. One of the hooks 29 is engaged with one of the arms 11, thus locking the rotary member 5 to the base member 3. If the vehicle is moved forwardly, the members 3 and 5 will be revolved with the wheel 2, and the wire will be wound upon the members 20, the latter being set in the holding position shown in Fig. 2, and at the left in Fig. 5. After a bundle has been wound on the members 20, the links 22 and 23 are swung to the release position shown at the right in Fig. 5, in which position the bundle may be slipped off.

To unwind the wire from the bundle, the member 28 is unhooked from the arm 11 with which the member 28 is engaged, thereby permitting the member 5 to be revolved, so that the wire will be withdrawn from the members 20, either by pulling on the wire, or by holding the wire and moving the wagon forwardly. As the plates 16 can be adjusted radially on the U-shaped portions 13, said plates 16 are adjusted so as to be equidistant from the axis of the wheel 2. The bundle of wire mounted on the members 20 will be held concentric with the wheel 2, so that the winding or unwinding of the wire will be effected in an even and not a jerky manner.

If desired the apparatus, instead of being mounted on a wheel, may be used as shown in Fig. 6, in which case the member 3 is clamped horizontally by the bolts 8 to a horizontal crossbar 33, which is mounted on the upper edges of the sideboards of the bed 1, and which is clamped to the bottom of the bed by vertical bolts 34. A bundle of wire may be then mounted upon the members 20 when the latter are in the released position. The members 20 are then swung to the coil holding position and locked in such position in the manner already described. If the vehicle is now moved forwardly and the free end of the wire is held, the wire will be withdrawn from the members 20 as already described, the hook member 28 being in the release position.

I do not limit my invention to the structure shown and described, as many modifications, within the scope of the appended claims may be made without departing from the spirit of my invention.

What I claim is:

1. In a wire reel, a rotary support, a member carried by said support and having two diametrically opposite U shaped radial portions, two clamping plates respectively radially adjustable on said U-shaped portions, means for securing each clamping plate in the position in which it may be adjusted and for holding it from turning, two coil holding members respectively pivoted to said clamping plates and movable to and from a coil holding position, and releasable means for locking the coil holding members in the holding position, substantially as set forth.

2. In a wire reel, two crossed bars fastened together, each having two diametrically opposite radial U-shaped portions, a rotary support to which one set of arms of said portions are attached, a plurality of pairs of clamping members, said pairs being radially adjustable respectively on said U-shaped portions, a plurality of pairs of bolts, each pair of bolts connecting the members of each pair of clamping members and extending between the arms of the adjacent U-shaped portion for holding the clamping members in the positions in which they are adjusted, coil holding members respectively pivoted to one set of clamping members of said pairs, and releasable means for locking the coil holding members in a coil holding position, substantially as set forth.

In testimony whereof I have signed my name to this specification.

ESTEL L. CROSWHITE.